United States Patent
Bender

(10) Patent No.: US 9,623,727 B2
(45) Date of Patent: Apr. 18, 2017

(54) ACCESSORY MOUNTING SYSTEM FOR LAMINATED GLASS WINDSHIELD

(71) Applicant: Taylor Made Group, LLC, Gloversville, NY (US)

(72) Inventor: Thomas J. Bender, Fort Wayne, IN (US)

(73) Assignee: TAYLOR MADE GROUP, LLC, Gloversville, NY (US)

( * ) Notice: Subject to any disclaimer, the term of this patent is extended or adjusted under 35 U.S.C. 154(b) by 153 days.

(21) Appl. No.: 14/185,529

(22) Filed: Feb. 20, 2014

(65) Prior Publication Data

US 2015/0231950 A1 Aug. 20, 2015

(51) Int. Cl.
*B60J 1/20* (2006.01)
*B60R 11/00* (2006.01)

(52) U.S. Cl.
CPC ............... *B60J 1/20* (2013.01); *B60R 11/00* (2013.01); *B60R 2011/0026* (2013.01); *B60R 2011/0042* (2013.01); *Y10T 403/52* (2015.01); *Y10T 403/7075* (2015.01)

(58) Field of Classification Search
CPC ......... E05D 5/0246; B62J 17/02; B62J 17/04; B60J 1/20; B60J 10/00; B60R 11/00; B60R 2011/0026; B60R 2011/005
USPC ......... 248/548, 549, 467, 475.1, 900, 205.3, 248/205.1; 403/373, 376, 288; 296/84.1, 296/90, 92, 93; 156/108; 49/475.1, 49/489.1
See application file for complete search history.

(56) References Cited

U.S. PATENT DOCUMENTS

| | | | | |
|---|---|---|---|---|
| 2,069,032 A | * | 1/1937 | Fisher | B60J 10/0051 296/93 |
| 2,166,108 A | * | 7/1939 | Aage | B60S 1/54 200/209 |
| 4,650,240 A | * | 3/1987 | Rinella | B60J 10/02 296/93 |
| 4,666,028 A | * | 5/1987 | Saito | B66B 23/225 198/335 |
| 4,888,072 A | | 12/1989 | Ohlenforst et al. | |
| 4,932,512 A | * | 6/1990 | Rivera | B66B 23/24 198/335 |
| 5,820,097 A | | 10/1998 | Spooner | |
| 6,824,281 B2 | | 11/2004 | Schofield et al. | |
| 7,188,963 B2 | | 3/2007 | Schofield et al. | |
| 7,533,998 B2 | | 5/2009 | Schofield et al. | |
| 8,179,437 B2 | | 5/2012 | Schofield et al. | |
| 8,405,726 B2 | | 3/2013 | Schofield et al. | |
| 8,508,593 B1 | | 8/2013 | Schofield et al. | |
| 2007/0215031 A1 | * | 9/2007 | Bach | B63B 17/02 114/361 |
| 2009/0188082 A1 | * | 7/2009 | Huang | E05D 5/0246 16/382 |

* cited by examiner

*Primary Examiner* — Tan Le
(74) *Attorney, Agent, or Firm* — Nixon & Vanderhye P.C.

(57) ABSTRACT

An accessory mounting system for a laminated glass windshield includes first and second mating plates securable in a scallop in the laminated glass windshield. Each of the mating plates includes an indentation on an inside surface thereof, where the indentations of the first and second mating plates define a pocket. A stiffening plate is disposed in the pocket, and a fastener secures the first and second mating plates and the stiffening plate together. The first and second mating plates and the stiffening plate include an opening for securing a windshield accessory.

13 Claims, 2 Drawing Sheets

ACCESSORY MOUNTING SYSTEM FOR LAMINATED GLASS WINDSHIELD

CROSS-REFERENCES TO RELATED APPLICATIONS (NOT APPLICABLE)

STATEMENT REGARDING FEDERALLY SPONSORED RESEARCH OR DEVELOPMENT (NOT APPLICABLE)

BACKGROUND OF THE INVENTION

The invention relates to accessories for a laminated glass windshield and, more particularly, to an accessory mounting system for a windshield on which various vehicle-related components can be mounted.

It is typical to use laminated glass for windshields in various applications including road vehicles and boats and the like. It is often desirable to secure accessories to a windshield using holes formed in the windshield. Laminated glass, however, does not lend itself to having holes drilled therein. Not only is the glass with holes fragile, but each half of the "sandwich" has to have holes drilled, then aligned. A polycarbonate between the halves is then cut out where the holes are located.

Forming a hole in a laminated windshield is a tedious and costly process that is prone to misalignment. Additionally, the glass is more susceptible to breakage from wiper motor torques, gas shock forces, hinge forces, etc.

BRIEF SUMMARY OF THE INVENTION

It would be desirable to provide an accessory mounting system for laminated glass windshields that avoids the concerns of the prior art. Additionally, it would be desirable for such a mounting system to spread forces out over a much larger area of the glass.

In an exemplary embodiment, an accessory mounting system for a laminated glass windshield includes first and second mating plates securable in a scallop in the laminated glass windshield. Each of the mating plates includes an indentation on an inside surface thereof, where the indentations of the first and second mating plates define a pocket. A stiffening plate is disposed in the pocket, and a fastener secures the first and second mating plates and the stiffening plate together. The first and second mating plates and the stiffening plate include an opening for securing a windshield accessory.

The first and second mating plates may be molded from rigid plastic, such as glass-filled nylon.

Each of the mating plates may define a track adjacent the windshield, where the accessory system includes a seal or an adhesive in the track.

A geometry of the first and second mating plates may be configured according to a function of the accessory to be mounted.

The stiffening plate may be formed of aluminum or steel.

In another exemplary embodiment, a windshield assembly includes a laminated glass windshield including a scallop, and the accessory mounting system.

In yet another exemplary embodiment, a windshield assembly includes a laminated glass windshield including a scallop, and an accessory mounting system for the laminated glass windshield. The accessory mounting system includes first and second mating plates securable in the scallop in the laminated glass windshield, where each of the mating plates has an indentation on an inside surface thereof, and where the indentations of the first and second mating plates define a pocket. A stiffening plate is disposed in the pocket, and a fastener secures the first and second mating plates and the stiffening plate together and clamping the laminated glass windshield. A seal is arranged between the first and second mating plates and the laminated glass windshield. The first and second mating plates and the stiffening plate include an opening for securing a windshield accessory.

The windshield assembly may additionally include a complement accessory mounting system cooperable with the accessory mounting system.

BRIEF DESCRIPTION OF THE DRAWINGS

These and other aspects and advantages will be described in detail with reference to the accompanying drawing, in which.

DETAILED DESCRIPTION OF THE INVENTION

Figure 1:
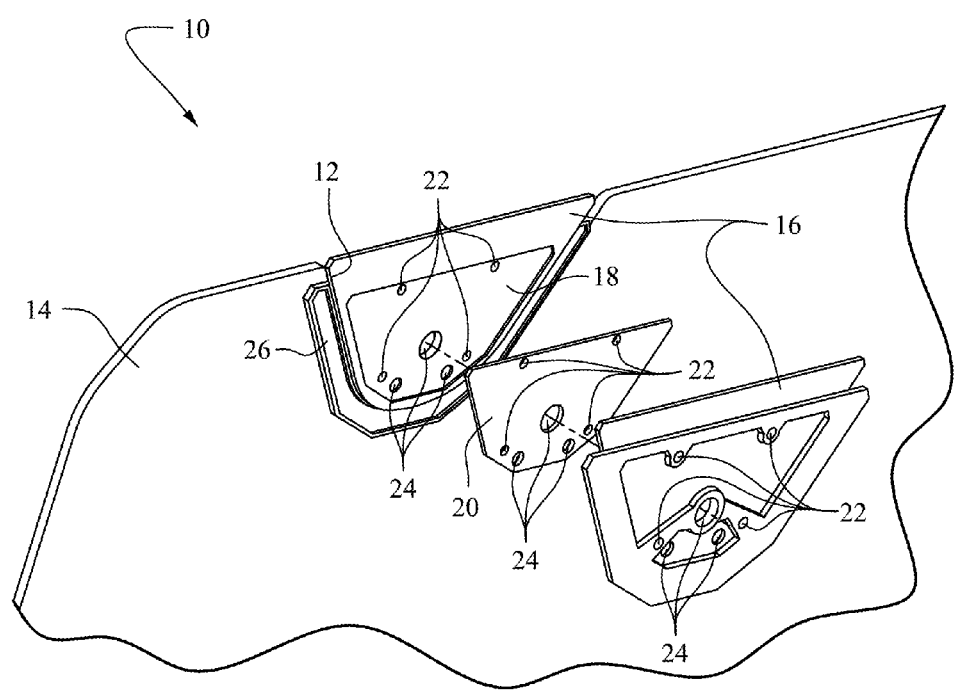
FIG. 1 is a perspective view of the accessory mounting system.

With reference to FIG. 1, the accessory mounting system 10 is shown secured in a scallop 12 cut in a laminated windshield 14. The accessory mounting system 10 includes two mating injection molded plates 16, each including an indentation 18 on an inside surface thereof. With the molded plates 16 in a mating arrangement, the facing indentations 18 define a pocket. The accessory mounting system 10 also includes a stiffening plate 20 formed of steel or aluminum or the like that is disposed in the pocket defined by the facing indentations 18.

The plates 16 and the stiffening plate 20 are held together with appropriate hardware via connecting holes 22, clamping the glass 14 between each half.

In one embodiment, the molded plates 16 are molded from a rigid plastic, such as, but not limited to, glass-filled nylon, preferably colored black to withstand degradation from UV radiation.

The molded plates 16 and stiffening plate 20 also include mounting holes 24 for mounting accessories to the laminated windshield. Exemplary accessories may include wiper motors, hinges, brackets, gas shocks, spritzers, and other related accessories.

Figure 2:
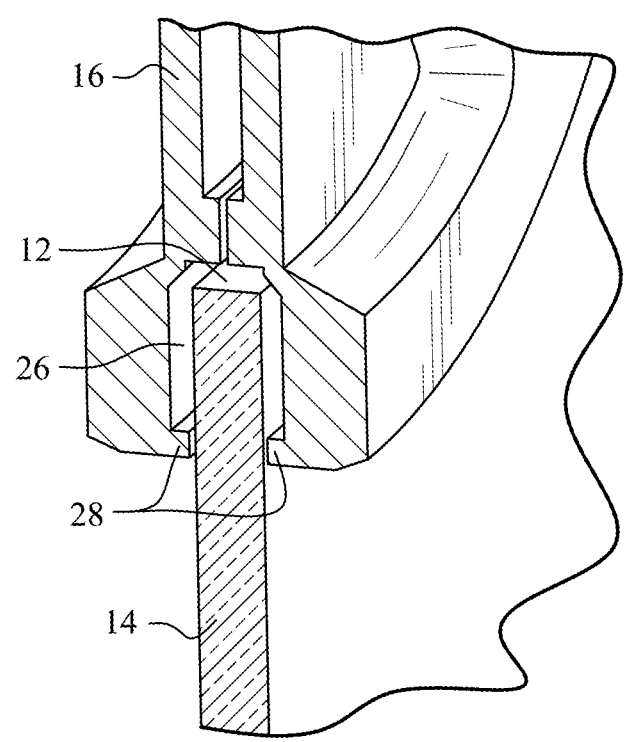
FIG. 2 is a side close-up view showing the molded plates and tracks.

The scallop 12 cut in the windshield 14 is generally sized to accommodate the molded plates 16. With reference to FIG. 2, an outer perimeter of the molded plates 16 extends over the scallop 12, and shoulders 28 engage the windshield 14 to define tracks 26 between the molded plates 16 and the windshield 14. The molded plates 16 are secured in the scallop, and a watertight seal can be made using either an appropriate seal placed in the tracks 26 formed in the molded plates 16 adjacent the scallop 12, or an adhesive can be applied in the same tracks 26.

The geometry of the molded plates 16 can be designed to accommodate a host of various fasteners, depending on the function of the mount. Additional geometry for alignment and locking is also designed into the halves to aid assembly.

Two or more of the mounting systems can be used if necessary on a single windshield. For example, the accessory mounting system may support a master unit and a slave unit, hinge mounting, gas spring mounting, etc.

The mounting system of the preferred embodiments can be used in automotive and non-automotive applications. The system alleviates the need for cutting holes in laminated glass and similarly eliminates the need for alignment of holes prior to laminating. The described system thus facilitates installation and eliminates the time and costs associated with forming holes in a laminated glass windshield.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An accessory mounting system for a laminated glass windshield, the accessory mounting system comprising:
   first and second mating plates securable in a scallop in the laminated glass windshield, each of the mating plates including an indentation on an inside surface, wherein the mating plates are secured in the scallop on opposite sides of the laminated glass windshield in a facing relationship such that the indentations of the first and second mating plates define a pocket, and wherein an outer perimeter of the mating plates extends over the scallop into engagement with the laminated glass windshield;
   a stiffening plate disposed between the mating plates in the pocket; and
   a fastener securing the first and second mating plates and the stiffening plate together,
   wherein the first and second mating plates and the stiffening plate include an opening for securing a windshield accessory.

2. An accessory system according to claim 1, wherein the first and second mating plates are molded from rigid plastic.

3. An accessory system according to claim 2, wherein the rigid plastic comprises glass-filled nylon.

4. An accessory system according to claim 1, wherein each of the mating plates defines a track adjacent the windshield, and wherein the accessory system further comprises a seal in the track.

5. An accessory system according to claim 1, wherein each of the mating plates defines a track adjacent the windshield, and wherein the accessory system further comprises an adhesive in the track.

6. An accessory system according to claim 1, wherein a geometry of the first and second mating plates is configured according to a function of the accessory to be mounted.

7. An accessory system according to claim 1, wherein the stiffening plate is formed of aluminum or steel.

8. A windshield assembly, comprising:
   a laminated glass windshield including a scallop; and
   an accessory mounting system for the laminated glass windshield, the accessory mounting system including:
   first and second mating plates secured on opposite planar sides of the laminated glass windshield in the scallop in the laminated glass windshield, wherein an outer perimeter of the mating plates extends over the scallop into engagement with the laminated glass windshield, and wherein the outer perimeter of the mating plates is secured to the laminated glass windshield, each of the mating plates including an indentation on an inside surface, wherein the mating plates are secured in the scallop in a facing relationship such that the indentations of the first and second mating plates define a pocket,
   a stiffening plate disposed in the pocket, wherein the first mating plate is disposed on one side of the stiffening plate, and wherein the second mating plate is disposed on an opposite side of the stiffening plate,
   a fastener securing the first and second mating plates and the stiffening plate together,
   wherein the first and second mating plates and the stiffening plate include an opening for securing a windshield accessory.

9. A windshield assembly according to claim 8, wherein each of the mating plates defines a track adjacent the windshield, and wherein the accessory system further comprises a seal in the track.

10. A windshield assembly according to claim 8, wherein each of the mating plates defines a track adjacent the windshield, and wherein the accessory system further comprises an adhesive in the track.

11. A windshield assembly according to claim 8, wherein a geometry of the first and second mating plates is configured according to a function of the accessory to be mounted.

12. A windshield assembly, comprising:
    a laminated glass windshield including a scallop; and
    an accessory mounting system for the laminated glass windshield, the accessory mounting system including:
    first and second mating plates secured in the scallop on opposite sides of and engaging the laminated glass windshield, each of the mating plates including an indentation on an inside surface, wherein the mating plates are secured in the scallop in a facing relationship such that the indentations of the first and second mating plates define a pocket,
    a stiffening plate disposed in the pocket,
    a fastener extending in order through the first mating plate, then through the stiffening plate, then through the second mating plate, thereby securing the first and second mating plates and the stiffening plate together and clamping the first and second mating plates over the laminated glass windshield, and
    a seal between the first and second mating plates and the laminated glass windshield,
    wherein the first and second mating plates and the stiffening plate include an opening for securing a windshield accessory.

13. A windshield assembly according to claim 12, comprising a complement accessory mounting system cooperable with the accessory mounting system.

* * * * *